(12) United States Patent
Pineda Amo

(10) Patent No.: US 10,669,987 B2
(45) Date of Patent: Jun. 2, 2020

(54) METHODS OF OPERATING A WIND TURBINE

(71) Applicant: GE Renewable Technologies Wind B.V., Pa Breda (NL)

(72) Inventor: Isaac Pineda Amo, Sant Cugat del Valles (ES)

(73) Assignee: GE RENEWABLE TECHNOLOGIES WIND B.V., Breda (NL)

( * ) Notice: Subject to any disclaimer, the term of this patent is extended or adjusted under 35 U.S.C. 154(b) by 0 days.

(21) Appl. No.: 16/225,434

(22) Filed: Dec. 19, 2018

(65) Prior Publication Data

US 2019/0264653 A1 Aug. 29, 2019

Related U.S. Application Data

(62) Division of application No. 14/760,687, filed as application No. PCT/EP2014/050903 on Jan. 17, 2014, now Pat. No. 10,161,383.
(Continued)

(30) Foreign Application Priority Data

Jan. 17, 2013 (EP) ..................................... 13382013

(51) Int. Cl.
*F03D 7/02* (2006.01)
*F03D 7/04* (2006.01)

(52) U.S. Cl.
CPC ........... *F03D 7/0224* (2013.01); *F03D 7/042* (2013.01); *F05B 2270/1011* (2013.01);
(Continued)

(58) Field of Classification Search
CPC .... F03D 7/042; F03D 7/0224; F05B 2270/32; F05B 2270/322; F05B 2270/1011; Y02E 10/723
See application file for complete search history.

(56) References Cited

U.S. PATENT DOCUMENTS 6,361,275 B1 * 3/2002 Wobben ................ F03D 7/0224
416/33
8,096,761 B2 1/2012 Fric
(Continued)

FOREIGN PATENT DOCUMENTS

| EP | 1 612 414 | 1/2006 |
| EP | 2 177 754 | 4/2010 |
| EP | 2 481 916 | 8/2012 |

OTHER PUBLICATIONS

PCT Search Report and Written Opinion for PCT/EP2014/050903, dated Apr. 25, 2014.
(Continued)

*Primary Examiner* — Timothy L Maust
(74) *Attorney, Agent, or Firm* — Dority & Manning, P.A.

(57) ABSTRACT

Methods of operating a variable speed wind turbine as a function of a wind speed, the wind turbine having a rotor with a plurality of blades, and one or more pitch mechanisms for rotating the blades. The method comprising a sub-nominal zone of operation for wind speeds below the nominal wind speed and a supra-nominal zone of operation for wind speeds above the nominal wind speed. In the supra-nominal zone, the blades are pitched so as to maintain the rotor speed substantially constant, and a tip speed ratio of the wind turbine is substantially continuously being determined and wherein an instantaneous minimum pitch angle is substantially continuously being determined based on the instantaneous tip speed ratio, and the blades are never pitched below the instantaneous minimum pitch angle. The disclosure further relates to a wind turbine suitable for carrying out such methods.

7 Claims, 8 Drawing Sheets

Related U.S. Application Data (60) Provisional application No. 61/802,967, filed on Mar. 18, 2013.

(52) U.S. Cl.
CPC ..... *F05B 2270/32* (2013.01); *F05B 2270/322* (2013.01); *Y02E 10/723* (2013.01)

(56) References Cited

U.S. PATENT DOCUMENTS

| | | | |
|---|---|---|---|
| 9,494,624 B2 * | 11/2016 | Prats Mustaros | G01R 19/2513 |
| 9,719,494 B2 * | 8/2017 | Prats Mustaros | F03D 7/028 |
| 10,215,159 B2 * | 2/2019 | Pineda Amo | F03D 7/0224 |
| 2007/0057517 A1 * | 3/2007 | McNerney | F03D 7/0224 290/44 |

OTHER PUBLICATIONS

International Standard IEC 61400-1, Third Ed., Aug. 2005, Part 1, 18 pgs.

\* cited by examiner

METHODS OF OPERATING A WIND TURBINE

The present application is a Divisional Application of application Ser. No. 14/760,687, filed Jul. 13, 2015, claims the benefit of European Patent Application EP 13382013.4 filed on Jan. 17, 2013, and U.S. Provisional Patent Application Ser. No. 61/802,967 filed on Mar. 18, 2013.

The present disclosure relates to methods of operating a wind turbine.

BACKGROUND ART

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft either directly drives the generator rotor ("directly driven") or through the use of a gearbox.

A variable speed wind turbine may typically be controlled by varying the generator torque and the pitch angle of the blades. As a result, aerodynamic torque, rotor speed and electrical power will vary.

Figure 1:
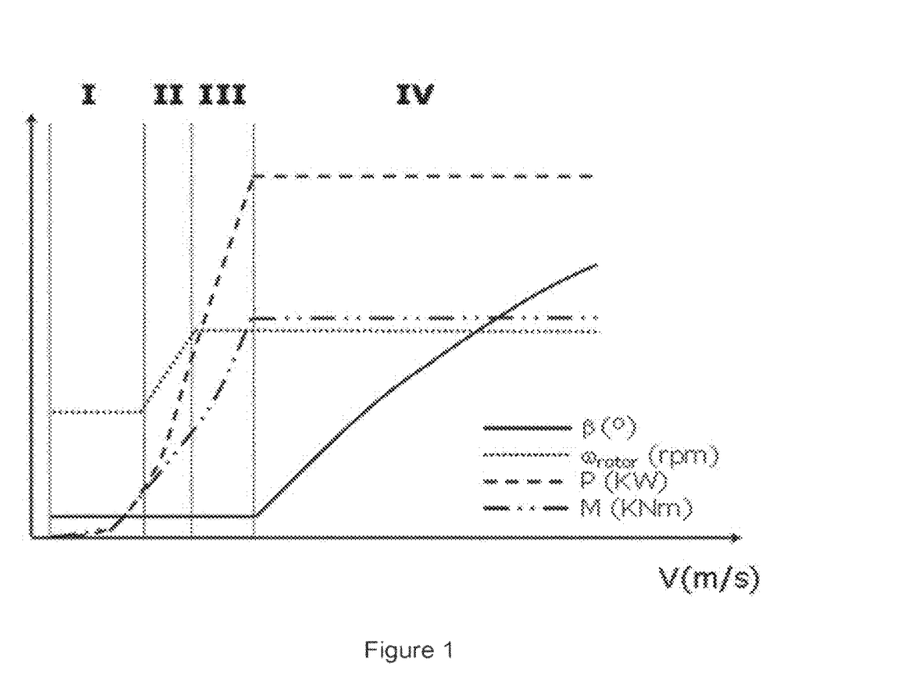
FIG. 1 illustrates a typical power curve of a wind turbine.

A common prior art control strategy of a variable speed wind turbine is described with reference to FIG. 1. In FIG. 1, the operation of a typical variable speed wind turbine is illustrated in terms of the pitch angle (β), the electrical power generated (P), the generator torque (M) and the rotational velocity of the rotor (ω), as a function of the wind speed.

In a first operational range, from the cut-in wind speed to a first wind speed (e.g. approximately 5 or 6 m/s), the rotor may be controlled to rotate at a substantially constant speed that is just high enough to be able to accurately control it. The cut-in wind speed may be e.g. approximately 3 m/s.

In a second operational range, from the first wind speed (e.g. approximately 5 or 6 m/s) to a second wind speed (e.g. approximately 8.5 m/s), the objective is generally to maximize power output while maintaining the pitch angle of the blades constant so as to capture maximum energy. In order to achieve this objective, the generator torque and rotor speed may be varied so as keep the tip speed ratio λ (tangential velocity of the tip of the rotor blades divided by the prevailing wind speed) constant so as to maximize the power coefficient $C_p$.

In order to maximize power output and keep $C_p$ constant at its maximum value, the rotor torque may be set in accordance with the following equation:

$T = k \cdot \omega^2$, wherein k is a constant, and ω is the rotational speed of the generator. In a direct drive wind turbine, the generator speed substantially equals the rotor speed. In a wind turbine comprising a gearbox, normally, a substantially constant ratio exists between the rotor speed and the generator speed.

In a third operational range, which starts at reaching nominal rotor rotational speed and extends until reaching nominal power, the rotor speed may be kept constant, and the generator torque may be varied to such effect. In terms of wind speeds, this third operational range extends substantially from the second wind speed to the nominal wind speed e.g. from approximately 8.5 m/s to approximately 11 m/s.

In a fourth operational range, which may extend from the nominal wind speed to the cut-out wind speed (for example from approximately 11 m/s to 25 m/s), the blades may be rotated ("pitched") to maintain the aerodynamic torque delivered by the rotor substantially constant. In practice, the pitch may be actuated such as to maintain the rotor speed substantially constant. At the cut-out wind speed, the wind turbine's operation is interrupted.

In the first, second and third operational ranges, i.e. at wind speeds below the nominal wind speed (the sub-nominal zone of operation), the blades are normally kept in a constant pitch position, namely the "below rated pitch position". Said default pitch position may generally be close to a 0° pitch angle. The exact pitch angle in "below rated" conditions however depends on the complete design of the wind turbine.

The before described operation may be translated into a so-called power curve, such as the one shown in FIG. 1. Such a power curve may reflect the optimum operation of the wind turbine under steady-state conditions. However, in non-steady state (transient) conditions, the operation may not necessarily be optimum.

As further background, basic aerodynamic behaviour of (the blades of) a wind turbine is explained with reference to FIGS. 2a-2f.

Figure 2A:
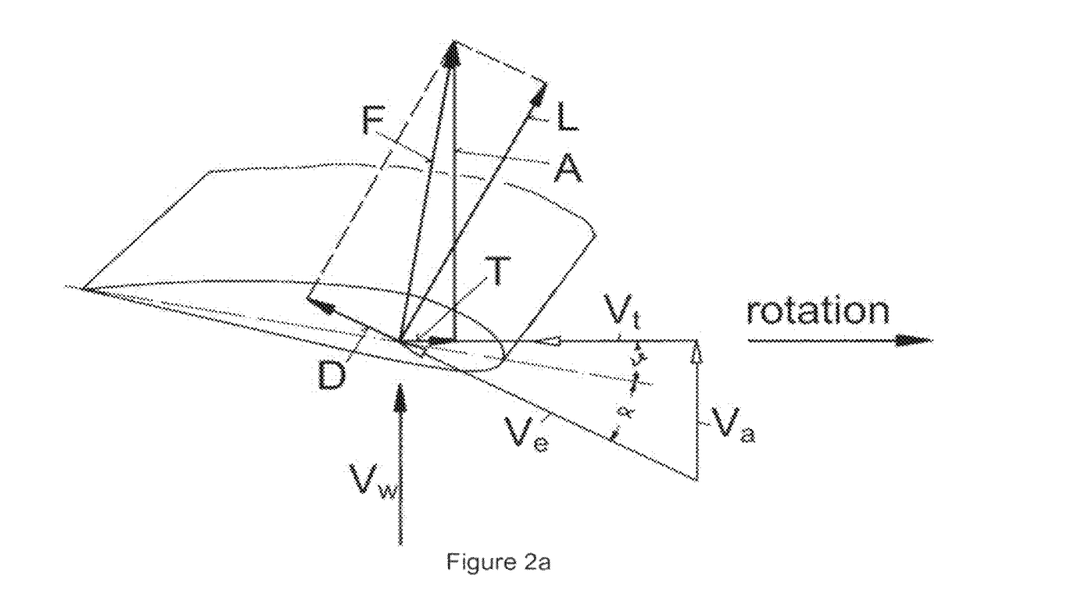
FIGS. 2a-2f illustrate aerodynamics of wind turbine blades and aerodynamic profiles in general.

In FIG. 2a, a profile of a wind turbine blade is depicted in operation. The forces generated by the aerodynamic profile are determined by the wind that the profile "experiences", the effective wind speed $V_e$. The effective wind speed is composed of the axial free stream wind speed $V_a$ and the tangential speed of the profile $V_t$. The tangential speed of the profile $V_t$ is determined by the instantaneous rotor speed ω and the distance to the centre of rotation of the profile, the local radius r, i.e. $V_t = \omega \cdot r$.

The axial free stream wind speed $V_a$ is directly dependent on the wind speed $V_w$ and on the speed of the wind downstream from the rotor $V_{down}$, that is $V_a = \frac{1}{2}(V_w + V_{down})$. The axial free stream wind speed may e.g. be equal to approximately two thirds of the wind speed $V_w$.

The resultant wind flow, or effective wind speed $V_e$, generates lift L and drag D on the blade. A blade may theoretically be divided in an infinite number of blade sections, each blade section having its own local radius and its own local aerodynamic profile. For any given rotor speed, the tangential speed of each blade section will depend on its distance to the rotational axis of the hub (herein referred to as local radius).

The lift generated by a blade (section) depends on the effective wind speed $V_e$, and on the angle of attack of the blade (section) α, in accordance with the following formula:

$$L = \frac{1}{2} \rho \cdot C_L V_e^2 \cdot S,$$

wherein

ρ is the air density, $V_e$ is the effective wind speed, $C_L$ is the lift coefficient (wherein the lift coefficient is dependent on the angle of attack α) and S is the surface of the blade section.

Similarly, the drag D generated by a blade section can be determined in accordance with the following equation:

$$D = \frac{1}{2} \rho \cdot C_D V_e^2 \cdot S,$$

wherein $C_D$ is the drag coefficient dependent on angle of attack α.

For an entire wind turbine blade, the contribution to lift and drag of each blade section may be summed to arrive at the total drag and lift generated by the blade.

Both the drag coefficient $C_D$ and the lift coefficient $C_L$ depend on the profile or the blade section and vary as a function of the angle of attack of the blade section. The angle of attack α may be defined as the angle between the chord line of a profile (or blade section) and the vector of the effective wind flow, see also FIG. 2a.

Figure 2B:
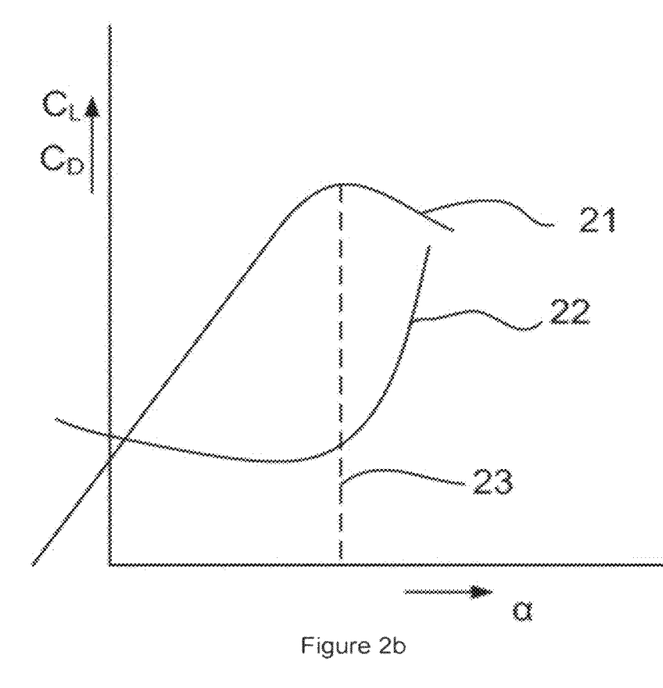
Figure 2C:
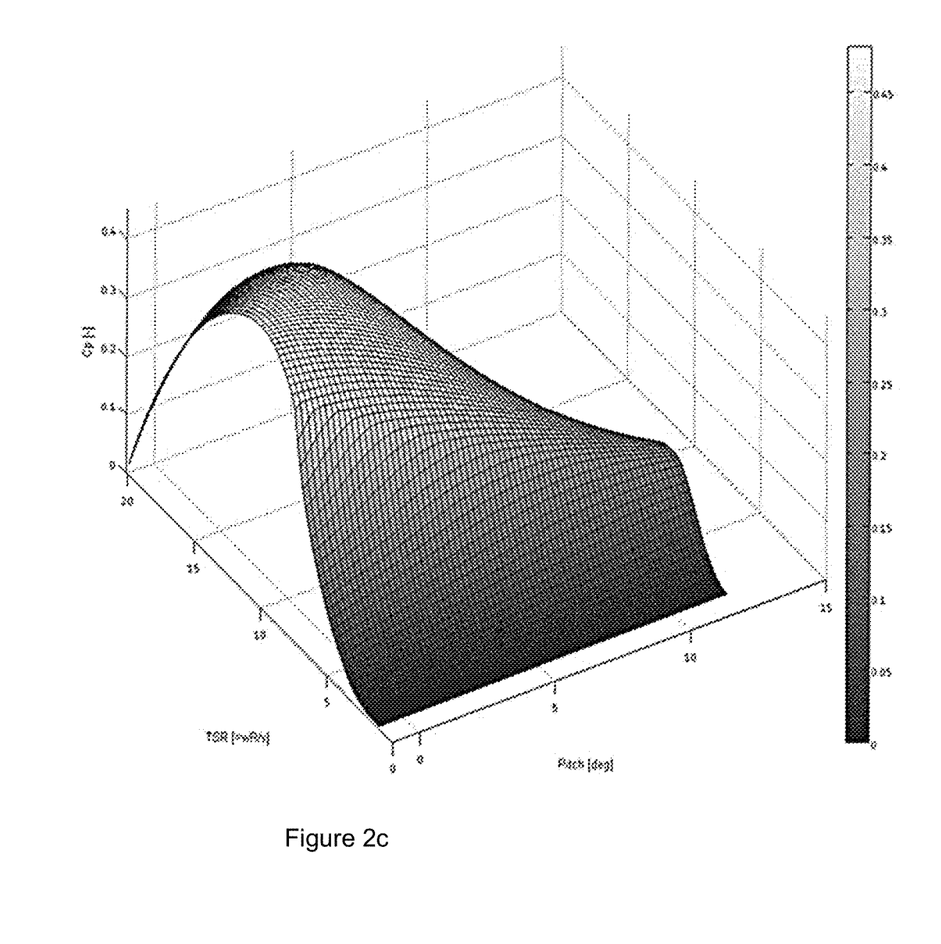

FIG. 2b illustrates in a very general manner how the lift coefficient and drag coefficient may vary as a function of the angle of attack of a blade section. Generally, the lift coefficient (reference sign 21) increases to a certain maximum at a so-called critical angle of attack 23. This critical angle of attack is also sometimes referred to as stall angle. The drag coefficient (reference sign 22) may generally be quite low and starts increasing in an important manner close to the critical angle of attack 23. This rapid change in aerodynamic behaviour of a profile or blade section is linked generally to the phenomenon that the aerodynamic flow around the profile (or blade section) is not able to follow the aerodynamic contour and the flow separates from the profile. The separation causes a wake of turbulent flow, which reduces the lift of a profile and increases the drag significantly.

The exact curves of the lift coefficient and drag coefficient may vary significantly in accordance with the aerodynamic profile chosen. However, in general, regardless of the aerodynamic profile chosen, a trend to increasing lift up until a critical angle of attack and also a rapid increase in drag after a critical angle of attack can be found.

In accordance with FIG. 2a, the tangential force generated by a blade section is given by T=L·sin(α+ϑ)−D·cos(α+ϑ), wherein ϑ is the pitch angle and α is the angle of attack. The pitch angle may be defined as the angle between the rotor plane and the chord line of a profile. Integrating the tangential force distribution over the radius provides the driving torque.

In order to increase the torque generated by the rotor, the angle of attack of any blade section is preferably kept below the critical angle of attack such that lift may be higher and drag may be lower.

It should be borne in mind that the angle of attack of each blade section depends on the tangential speed of the specific rotor blade section, the wind speed, the pitch angle and the local twist angle of the blade section. The local twist angle of a blade section may generally be considered constant, unless some kind of deformable blade is used. The tangential speed of the rotor blade section depends on the rotor speed (angular velocity of the rotor which is obviously the same for the whole blade and thus for each blade section) and on the distance of the blade section to the rotational axis.

For a given pitch angle, it follows that the angle of attack is determined by the tip speed ratio:

$$\lambda = \frac{\omega \cdot R}{V_w}.$$

From this, it follows that the torque generated by a rotor blade section may become a rather complicated function of the instantaneous tip speed ratio and the pitch angle of the blade. This complicated relationship may be illustrated with a figure such as FIG. 2c.

Figure 2D:
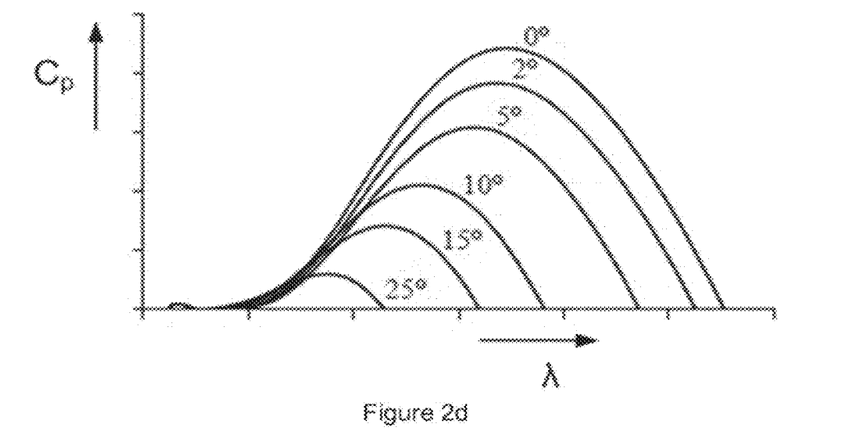

For every rotor blade section, the torque generated may be correlated to one of the lines of FIG. 2d of constant pitch angle. These lines depict the power coefficient ($C_p$), i.e. the ratio between the mechanical power captured by the wind turbine rotor and the available power in the wind, as a function of tip speed ratio λ and for different pitch angles. They may be obtained as cross-sections of planes of constant pitch angle with a figure such as the one shown in FIG. 2c.

As the power captured by the wind turbine is directly related to the generated torque, $C_p$ curves provide information about the torque dependence on pitch angle. For each pitch angle, there is a certain critical tip speed ratio. Below this tip speed ratio, stall may occur, i.e. the angle of attack is higher than the previously mentioned critical angle of attack.

Figure 2E:
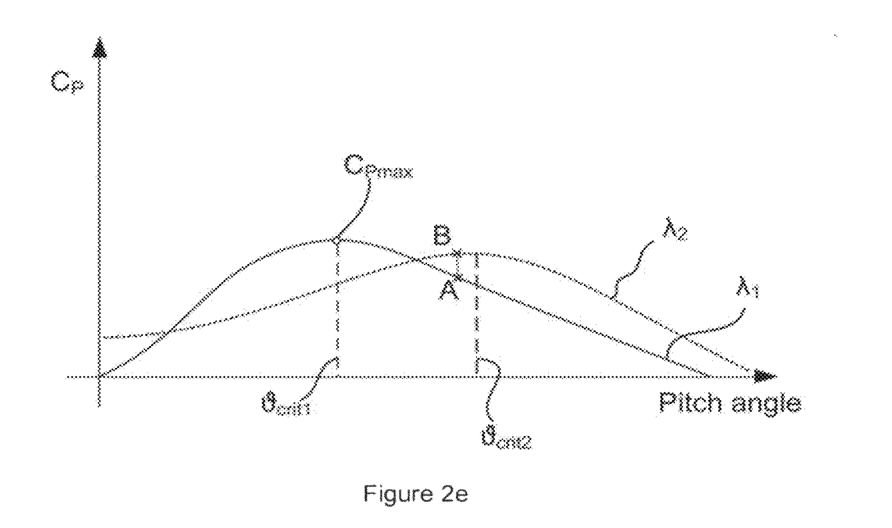

This may be illustrated in an alternative manner, such as shown in FIG. 2e. For a given tip speed ratio, e.g. $\lambda_1$, there is a certain critical pitch angle $\vartheta_{crit}$. This critical pitch angle gives the before-mentioned critical angle of attack for the given tip speed ratio. Below that critical pitch angle, stall may occur. At the same time for the given tip speed ratio, at the critical pitch angle, the captured power is maximum.

Now again with reference to FIG. 1, if the wind turbine is operating in the fourth operational range, i.e. in the supra-nominal zone of operation, the blades are pitched in an attempt to maintain the torque constant as the wind speed changes. In examples, this operational range may extend from the nominal wind speed to the cut-out wind speed.

It would be very hard to accurately adjust the pitch angle in response to wind speed measurements as obtained from a nacelle anemometer. A nacelle mounted anemometer will generally, due its location on top of the nacelle and behind the rotor, not measure the wind speed very accurately and its measurements may show a wind speed that largely varies with a high frequency. If the pitch system were to actuate on these measurements, it would constantly adjust the blade pitch (which would lead to premature wear of the pitch system) and the pitch system would not even be able to follow the commands that vary constantly. And if one also takes into account effects such as wind shear and wind veer, which cannot even be registered with a nacelle mounted anemometer, it becomes clear that the anemometer cannot be used for deriving pitch signals.

In practice therefore, instead of using measurements from an anemometer, the rotor speed is used. The rotor speed may be measured e.g. by measuring the generator rotor speed. In direct drive wind turbines, the rotor speed will correspond to the generator rotor speed, and in wind turbines employing a gearbox, there will generally be a fixed ratio between generator rotor speed and rotor speed.

The pitch system is then actuated in such a manner as to keep the rotor speed constant. This may work well in steady-state conditions or almost steady-state conditions, but in conditions which change relatively quickly, this may lead to undesirable results. This may be illustrated further with reference to FIG. 2e.

Suppose a situation in which the wind turbine is operating in the supra-nominal zone with a tip speed ratio $\lambda_1$. In this zone, the pitch angle will generally not be close to the critical pitch angle, wherein the critical pitch angle if the pitch angle corresponding for this particular situation to a critical angle of attack. The pitch angle will be higher than the critical angle, as the pitch of the blades is used to reduce the loads on the rotor and maintain aerodynamic torque substantially constant.

Let's now suppose that a sudden wind gust occurs, i.e. a significant increase in wind speed in a relatively short time. Due to the inertia of the rotor, the rotor speed will not immediately increase. As a consequence, also the pitch system will not immediately react to the increase in wind speed. It may be however, that due to the increase in wind speed, the wind turbine is now operating at another tip speed ratio, e.g. $\lambda_2$. (because the wind speed changes, but the rotor speed has not changed).

At this other tip speed ratio, $\lambda_2$, with the same pitch angle, stall may occur in the wind turbine blades, since the angle of attack of the blades may be above the critical angle of attack. With reference to FIG. 2e, the point of operation may have moved from point A to point B.

That is, in order to maintain an optimum angle of attack at the moment of the sudden wind gust, the pitch angle should be increased. Nevertheless, as the pitch system depends on the rotor inertia, it cannot track a sudden wind change, so blade pitch remains somewhat stuck, thus resulting in a large angle of attack. Depending on the precise effects of the wind, and the inertia of the rotor, it may be that the rotor speed even decreases a little bit, due to the separation of the flow from the blades. In response to this decrease in rotor speed, the pitch system will reduce the pitch angle more, thus aggravating the situation by further increasing the angle of attack.

Figure 2F:
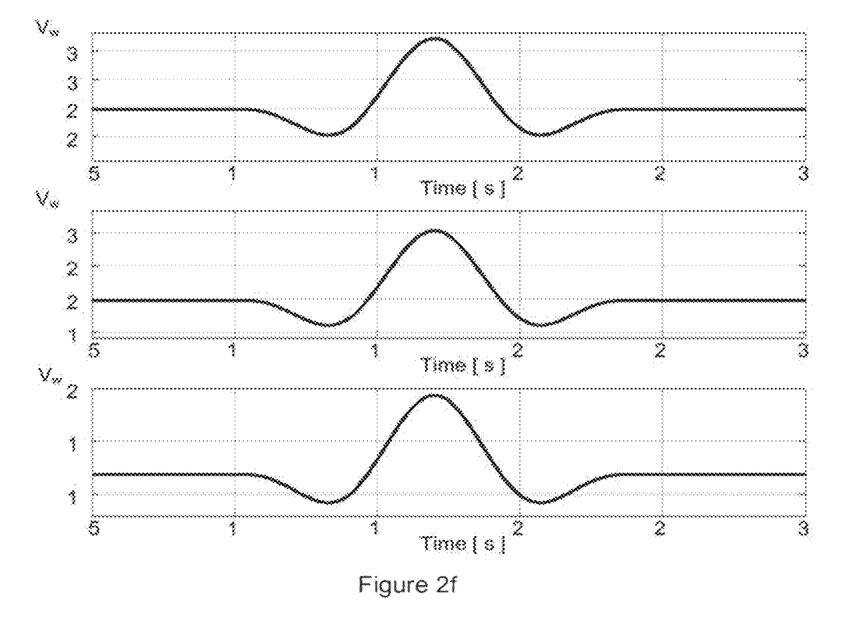

The above situation may be particularly troublesome in case of e.g. a Mexican hat wind gust, such as the ones depicted in FIG. 2f. Mexican hat wind gusts are defined in the IEC 64100-1 2nd edition 1999-02 standard, since they may be particularly dangerous wind gusts. This standard defines Mexican hat wind gusts at various speeds, and at various azimuth angles.

The loads a wind turbine suffers during such a wind gust are severe and may define design loads for the wind turbine. This is due to the decrease in wind speed, before the high increase in wind speed (see FIG. 1). When the wind speed decreases, the pitch system tries to adapt the blades to this decrease (the blades are initially rotated in such a way to increase the aerodynamic torque by increasing their angle of attack, i.e. the pitch rate is below zero). With the pitch adaptation still ongoing, a significant increase in wind speed occurs. The aerodynamic torque and the thrust force on the hub can thus be very high. The pitch of the wind turbine will then start to adapt to these new wind conditions. However, the wind speed keeps increasing and due to the inertia of the system, the pitch can possibly not be adapted quickly enough, thus leading to the wind turbine potentially stalling and suffering increased loads. A typical pitch system may have an inherent pitch limitation of approximately 5°/second. Such a pitch rate may in principle be fast enough to respond to wind variations occurring during operation of the wind turbine. In general, the limiting factor may not be the pitch drive system but the means used to sense wind speed, i.e. rotor speed.

There still exists a need for a method of operating a wind turbine that at least partially reduces the aforementioned problems.

SUMMARY

In a first aspect, a method of operating a variable speed wind turbine as a function of a wind speed is provided. The wind turbine has a rotor with a plurality of blades, and one or more pitch mechanisms for rotating the blades.

The method comprises a sub-nominal zone of operation for wind speeds below the nominal wind speed and a supra-nominal zone of operation for wind speeds above the nominal wind speed. According to this aspect, in the supra-nominal zone, the blades are pitched so as to maintain the rotor speed substantially constant, and a tip speed ratio of the wind turbine is substantially continuously being determined and wherein an instantaneous minimum pitch angle is substantially continuously being determined based on the instantaneous tip speed ratio, and the blades are never pitched below the minimum pitch angle.

In accordance with this aspect, the wind turbine can follow normal operation for (substantially) steady-state conditions. At the same time, the problem of stalling of the blades in case of transients can be avoided; the tip speed ratio is monitored substantially continuously (i.e. with a frequency high enough to adapt for wind changes). The frequency of determining the tip speed ratio may e.g. be every 0.5 seconds, every second, or every few seconds. By determining the tip speed ratio "in real-time", at any time, the minimum pitch angle that should not be surpassed is known. Using this information, this minimum pitch angle is set as a boundary condition for normal operation, or at least in the supra-nominal zone of operation. In the supra-nominal zone of operation, the actual pitch angle will normally be significantly higher than this minimum pitch angle and normal operation will thus not be affected. Only in case of transients, the added boundary condition helps the wind turbine to operate better.

This improved operation may be achieved without the need for adding any special equipment or sensors. In conventional wind turbines, a nacelle mounted anemometer is generally present. The generator or rotor speed is normally measured in conventional wind turbines as well.

In some embodiments, the minimum pitch angle is defined as the pitch angle corresponding to a critical angle of attack of a wind turbine blade section. The critical angle of attack of a wind turbine blade section is the angle of attack at which the wind turbine blade section starts to stall. Importantly, the precise angle of attack for any section of a blade may be different, as it depends on local twist angle and the distance of the section to the rotational axis, as well as on the wind speed and pitch angle, the last two factors being common for the whole blade, but the first two varying along the blade.

In alternative embodiments, the minimum pitch angle may be defined as the pitch angle corresponding to an angle of attack that is a predefined amount or percentage below a critical angle of attack of a wind turbine blade section. This predefined amount or percentage may be regarded as a security measure.

In some examples, the representative wind turbine blade section may be chosen as the section at 25% of the blade length.

In a second aspect, a wind turbine is provided having a generator, a rotor with a plurality of blades, one or more pitch mechanisms for rotating the blades, a system for determining the rotor speed, a wind speed sensor, and a control system comprising a pitch control system and a generator control system. The generator control system is adapted to control the generator and the pitch control system is adapted to control the pitch mechanisms. The generator control system is adapted to determine generator torque commands in accordance with a steady-state control loop and the pitch control system is adapted to determine pitch commands in accordance with a transient control loop and the steady-state control loop. The steady-state control loop is adapted to calculate generator torque set commands and pitch set commands based at least partially on the instantaneous rotor speed determined by the system for determining the rotor speed. The transient control loop is adapted to calculate an instantaneous tip speed ratio based on a wind speed measured by the wind speed sensor and the instantaneous rotor speed determined by the system for determining the rotor speed, and is further adapted to determine instantaneous minimum pitch commands based on the instantaneous tip speed ratio. In a supra-nominal zone of operation for wind speeds above a nominal wind speed, the pitch control system is adapted to determine whether the pitch set command is above the instantaneous minimum pitch command, and in case of positive result, follow the received pitch set command. In case of negative result, the pitch control system is adapted to follow the instantaneous minimum pitch command.

In this aspect, a wind turbine is provided with a control system that may be adapted to follow a predefined power curve. In a supra-nominal zone of operation, the wind turbine may thus be adapted to varying wind speeds by adjusting a pitch angle of the blades in order to maintain rotor speed (or generator speed) constant. At the same time, at least in this supra-nominal zone, an instantaneous minimum pitch angle is monitored constantly and the control system ensures that this minimum pitch angle is superposed as a minimum boundary on the normal pitch control. Aerodynamic stall of the rotor blades may thus be avoided.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS

Figure 3:
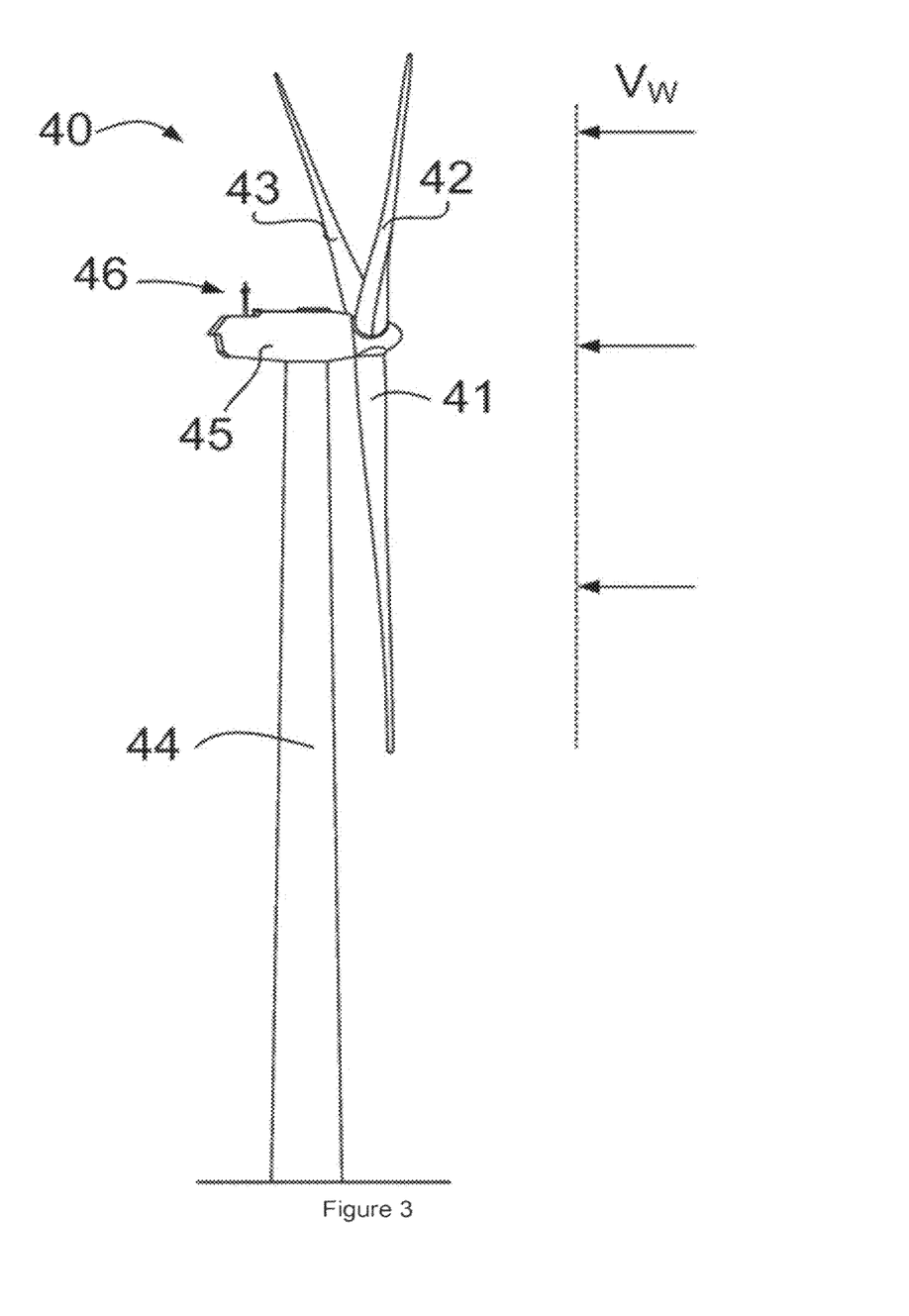
FIG. 3 illustrates a wind turbine.

FIG. 3 illustrates a wind turbine 40 having a rotor with three blades 41, 42 and 43. A nacelle 45 is mounted on wind turbine tower 44. An anemometer 46 is mounted on the nacelle 45. The anemometer 46 may be used to measure wind speed, however because of its location on the nacelle, behind the rotor, the wind speed measured by the anemometer may vary a lot and in general may not be very reliable.

The wind turbine may have one or more pitch systems to rotate the blades 41, 42, 43 collectively or individually. FIG. 1 represents a typical power curve for a variable speed wind turbine with pitch capability. As mentioned before, above the nominal wind speed, the generator torque and rotor speed may be maintained constant even though the wind speed increases. This can be achieved by pitching the wind turbine blades, i.e. by rotating the blades along their longitudinal axes and with respect to the hub; by increasing the pitch of the blades, their angle of attack decreases and their contribution to the torque also decreases.

The ideal power curve as depicted in FIG. 1 may most reliably be followed during steady-state conditions if the pitch system(s) is/are directly controlled by a sensor indicating the rotor speed. The rotational speed of the rotor may be measured directly or may be determined by measuring the rotational speed of the generator rotor. The pitch system is thus actuated to keep the speed constant, and if generator torque is maintained constant as well, this means that aerodynamic torque is maintained substantially constant as well.

A problem arises in case of transients wind conditions. A particularly challenging situation may be a Mexican hat wind gust in the supra-nominal zone of operation. However, examples of the present invention may equally well be suitable in different transient conditions, such as sudden increases or decreases of wind speeds, for example in case of increased turbulence.

In the case of a Mexican hat wind gust, the wind speed first decreases. Although the rotor may be slow to react, the rotor speed may diminish a little bit. The reaction of the pitch system may thus be to increase the angle of attack of the blades (i.e. decrease the pitch) so that the blades capture the wind "better", i.e. increase their lift.

Figure 4A:
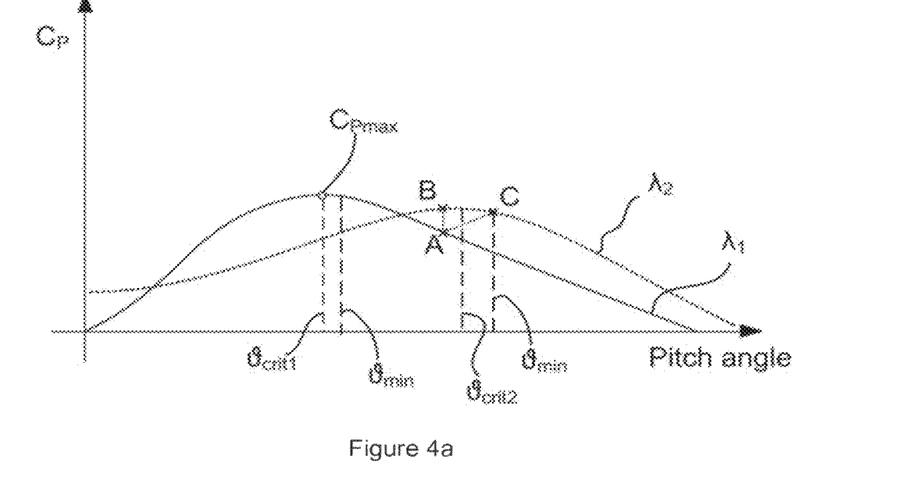
FIGS. 4a and 4b illustrate aerodynamics related to examples of methods according to the present invention.

After the decrease in wind speed, the wind speed suddenly increases. Once again, the rotor will be slow to react. The rotor speed may increase, and in reaction the pitch of the blades may be increased, but this may not be sufficient. Due to the previous decrease in pitch and corresponding increase in angle of attack, when the wind speed starts to rise, the angle of attack of the blade may surpass the critical angle of attack, and the blades may stall. With reference to FIG. 4a, the point of operation moves from point A, at tip speed ratio equal to $\lambda_1$, to point B, which results from a similar pitch (the inertia of the rotor is not capable of tracking wind variations, so the input to the pitch drive system remains almost unaltered during the wind gust) and a significantly reduced tip speed ratio, $\lambda_2$.

A consequence of the stall may be relatively high loads. Another consequence may be a decrease in rotor speed. As such, the reaction of the pitch system may be to further decrease the pitch (and increase the angle of attack), thus aggravating the stall.

In accordance with some examples of the invention, the tip speed ratio may be determined in a substantially continuous manner by measuring both wind speed and (generator) rotor speed. Given the real-time tip speed ratio, a minimum pitch angle may be determined which corresponds to a maximum angle of attack of the blade which should not be surpassed. This maximum angle of attack of the blade may correspond substantially to a critical angle of attack. Alternatively, it may correspond to an angle of attack with a predefined distance to the critical angle of attack.

In the aforementioned example, when the wind speed starts to increase, the anemometer will be able to measure the increase in wind speed before the rotor speed increases. Whereas the input for the pitch system normally is the rotor speed, in this case, a boundary condition is set for the pitch angle not to surpass a minimum pitch angle as determined based on the anemometer (or LIDAR or other wind measuring device). With reference to FIG. 4a, the point of operation moves from point A to point C (instead of to point B), which is located to the right of $\vartheta_{crit,2}$, that is, to the right of the pitch angle that would lead to stalling of the blade. The blades will thus not stall and operation may continue in a more efficient manner, with lower blade loads. Furthermore, tower loads are also reduced as situations with high wind and low speed are avoided. These situations result in high thrust on the wind turbine rotor which would lead to abnormally high loads on the tower as well.

The same effect can be also explained with reference to FIG. 4b. The curve indicated with "normal" illustrates the blade pitch angle as a function of the tip speed ratio under steady-state conditions as may be determined in accordance with a power curve such as the one illustrated in FIG. 1.

The curve indicated with the label "critical" illustrates that for each tip speed ratio, a critical pitch angle, $\vartheta_{crit}$, exists. This curve defines the blade pitch lower boundary. Thus, given a certain tip speed ratio, pitch values below the second curve may result in stall. These pitch values are therefore to be avoided in order to keep loads under control.

As already mentioned with reference to FIG. 4a, an initial steady state situation might correspond to the wind turbine operating in the supra-nominal zone with a tip speed ratio $\lambda_1$. Under these circumstances, a blade pitch angle on the steady-state curve, $\vartheta_1$, would normally be found (operating point shown as "A").

In case of a wind gust, a significant shift may result in the tip speed ratio, which may be reduced from $\lambda_1$ to $\lambda_2$. Nevertheless, as the rotor inertia is too large to track said wind variations, the pitch set point as defined by prior-art methods, remains almost unaffected around $\vartheta_1$ (operating point "B"). Consequently, the new operating point, which is characterized by a too low pitch angle for the prevailing tip speed ratio, lies in the unstable region. Stall may occur, and loads may increase.

This problem may be avoided, according to the present invention, by using a second blade pitch setpoint that defines a minimum boundary. This value is not dependent on the rotor speed but on the tip speed ratio. In one example, the curve labelled "critical", defining $\vartheta_{crit}$ values for each tip speed ratio may be used as this minimum boundary. The resulting operational point would thus be point $C_2$.

In another example, a curve defining minimum pitch angle values which lie slightly above the critical pitch angles may be used as such a minimum boundary. In FIG. 4b, such a curve is labelled with "minimum". The resulting operating point may thus be point $C_1$.

The minimum pitch values may in some embodiments be e.g. the pitch angle corresponding to an angle of attack that is a predefined amount or percentage below a critical angle of attack of a representative wind turbine blade section for the supra-nominal zone of operation.

Figure 4B:
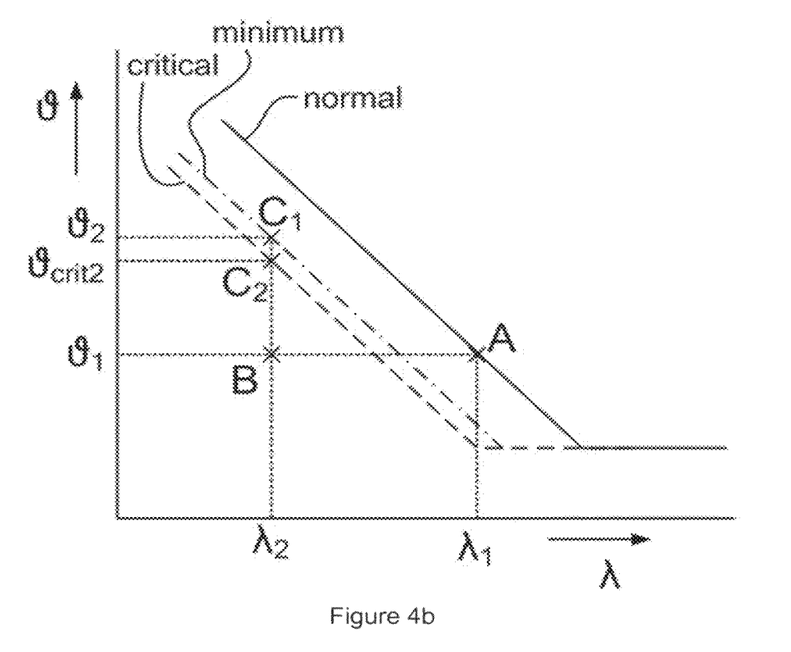

Even though in FIG. 4b the curves giving the relationship between tip speed ratio and pitch angle may be straight lines, it is to be understood that this is not necessarily the case.

Figure 5:
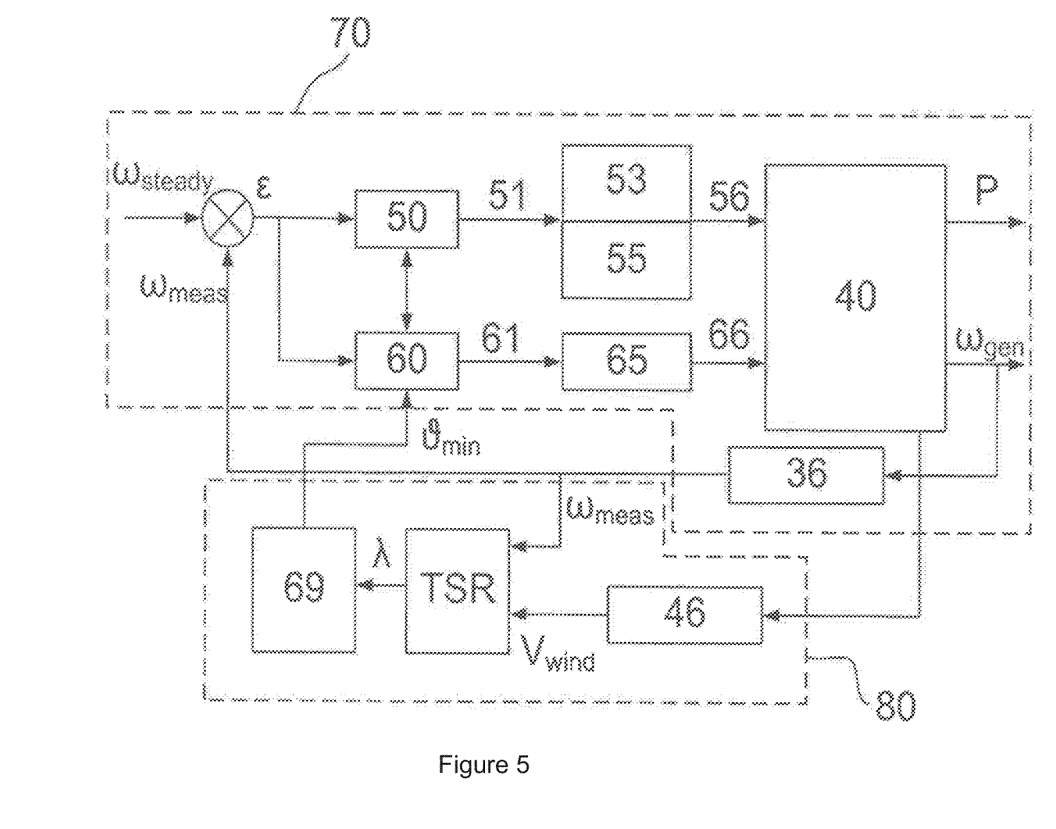
FIG. 5 illustrates a wind turbine and a control system according to an example of the present invention.

FIG. 5 illustrates a wind turbine and a control system according to an example of the present invention. Wind turbine 40 comprises a generator and one or more pitch actuators 65. The pitch actuators or pitch mechanisms may be controlled by a pitch control system 60. To this end, the pitch control system 60 may send pitch commands 61 to the pitch actuators 65. A result is the setting of pitch angle 66 in the wind turbine 40.

A generator control system 50 may send torque commands to a generator 55 and a converter 53 related to the generator. A result is the setting of the generator torque 56 in the wind turbine 40.

Results of both settings in the wind turbine include a generator speed, $\omega_{gen}$, and electrical power P generated.

A control system of the wind turbine may comprise a steady state control loop 70 and a transient control loop 80. The steady state control loop 70 may be adapted generally to control the wind turbine in such a way that a predefined power curve, e.g. such as the one in FIG. 1 is followed. The transient control loop may be adapted to ensure that the instantaneous pitch angles of the blades do not sink below a minimum pitch angle. This minimum pitch angle may be e.g. a critical pitch angle for a representative portion of the blade, e.g. at 25% of the blade length.

The steady state control loop 70, a generator speed sensor 36 may measure the generator speed, $\omega_{meas}$. A comparison of the measured generator speed, $\omega_{meas}$, with an expected generator speed $\omega_{steady}$ gives an error result ε. Based on the error, the torque controller 50 and the pitch controller 60 can determine pitch commands 61 and generator torque commands 51. Depending on the instantaneous operational range, the generator torque or the pitch angle of the blades, or both may be adapted to generally follow the predefined power curve.

The transient control loop 80, comprises a tip speed ratio calculator TSR. The calculation of an instantaneous tip speed ratio may be based on a wind speed $V_{wind}$ as measured by a nacelle mounted anemometer 46. The measurement from the anemometer upon which the determination of the minimum pitch angle is based, may be an average wind speed as measured by the anemometer over a period of e.g. 1-5 seconds, e.g. 3 seconds. Alternatively, any other system for determining a representative wind speed can be used, such as e.g. a LIDAR.

The calculation of the instantaneous tip speed ratio may be based on the measured generator speed, $\omega_{meas}$. The rotor speed used in the calculation may be the measured generator speed in the case of direct drive wind turbines, or may have a constant ratio with the generator speed in the case of wind turbines with a gearbox.

The calculated instantaneous tip speed ratio, $\lambda$, may be sent to a minimum pitch commander 69. Based e.g. on curves such as the ones shown in FIG. 4b, the minimum pitch commander may send instantaneous minimum pitch commands $\vartheta_{min}$ to the pitch controller 60. The pitch command 61 sent to the pitch mechanism(s) may be the pitch set command determined in the steady state control loop if it is above the minimum pitch command. If the pitch set command of the steady state control loop is below the instantaneous minimum pitch command the instantaneous minimum pitch command (as determined in the steady state control loop) is followed and sent to the pitch mechanism(s).

In a supra-nominal zone of operation, corresponding to wind speeds above nominal wind speeds, the steady state control loop may send constant generator torque commands to the converter 53 and generator 55 and varying pitch commands 61 to the pitch actuator(s) 65. The pitch commands are varied so as to maintain the generator speed constant. At the same time, the transient control loop 80 ensures that the pitch angle does not fall below a minimum pitch angle, so that the blade does not stall.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A wind turbine, comprising:
   a generator,
   a rotor with a plurality of blades,
   one or more pitch mechanisms for rotating the blades,
   a system for determining a rotor speed,
   a wind speed sensor,
   a control system comprising a pitch control system and a generator control system, the generator control system being adapted to control the generator, and the pitch control system being adapted to control the one or more pitch mechanisms, wherein the generator control system is adapted to determine generator torque commands in accordance with a steady-state control loop and the pitch control system is adapted to determine pitch angle commands in accordance with a transient control loop and the steady-state control loop,
wherein
the steady-state control loop is adapted to calculate generator torque set commands and pitch angle set commands based at least partially on an instantaneous rotor speed determined by the system for determining the rotor speed,
the transient control loop is adapted to calculate an instantaneous tip speed ratio based on a wind speed measured by the wind speed sensor and the instantaneous rotor speed determined by the system for determining the rotor speed, and is further adapted to determine instantaneous minimum pitch angle commands based on the instantaneous tip speed ratio, and
wherein in a supra-nominal zone of operation for wind speeds above a nominal wind speed, the pitch control system is adapted to determine whether the pitch angle command is above the instantaneous minimum pitch angle command, and
in case of a positive result,
the pitch control system follows the received pitch angle command; and in case of a negative result,
the pitch control system follows the instantaneous minimum pitch angle command; and
wherein the minimum pitch angle is defined as the pitch angle corresponding to an angle of attack that is a predefined amount or percentage below a critical angle of attack of a representative wind turbine blade section.

2. The wind turbine according to claim 1, wherein the wind speed sensor is an anemometer mounted on a nacelle of the wind turbine.

3. The wind turbine according to claim 1, wherein the system for determining the rotor speed comprises a generator speed sensor.

4. The wind turbine according to claim 2, wherein the instantaneous tip speed ratio is based on an average wind speed measured by the anemometer.

5. The wind turbine according to claim 2, wherein the wind speed measurement of the nacelle mounted anemometer is an average wind speed measured over a period of time of 1-5 seconds.

6. The wind turbine according to claim 1, wherein the wind speed sensor is a LIDAR.

7. The wind turbine according to claim 1, wherein the representative wind turbine blade section is a section of the blade at 25% of a length of the blade.

* * * * *